United States Patent
Mao (10) Patent No.: US 9,780,848 B2
(45) Date of Patent: Oct. 3, 2017

(54) LIMITED WATERFILLING: A METHOD TO ADJUST THE TRANSMIT POWER FOR EIGENVALUE BASED BEAMFORMING

(71) Applicant: Nokia Solutions and Networks Oy, Espoo (FI)

(72) Inventor: Xiaomao Mao, Hangzhou (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/326,688

(22) PCT Filed: Aug. 13, 2014

(86) PCT No.: PCT/CN2014/084264
§ 371 (c)(1),
(2) Date: Jan. 17, 2017

(87) PCT Pub. No.: WO2016/023191
PCT Pub. Date: Feb. 18, 2016

(65) Prior Publication Data
US 2017/0214440 A1      Jul. 27, 2017

(51) Int. Cl.
| | |
|---|---|
| *H04B 7/00* | (2006.01) |
| *H04B 7/04* | (2017.01) |
| *H04W 52/34* | (2009.01) |
| *H04B 7/06* | (2006.01) |
| *H04B 7/08* | (2006.01) |

(52) U.S. Cl.
CPC ......... *H04B 7/0443* (2013.01); *H04B 7/0617* (2013.01); *H04B 7/0634* (2013.01); *H04B 7/0865* (2013.01); *H04W 52/343* (2013.01)

(58) Field of Classification Search
CPC .. H04B 7/0443; H04B 7/0617; H04B 7/0634; H04B 7/0865; H04W 52/343
USPC .................................. 455/522, 67.11, 68–70
See application file for complete search history.

(56) References Cited

U.S. PATENT DOCUMENTS

| | | | |
|---|---|---|---|
| 8,280,426 B2 | 10/2012 | Guo et al. ..................... | 455/522 |
| 8,891,598 B1 * | 11/2014 | Wang .................. | H04L 25/0398 |
| | | | 370/241 |

(Continued)

FOREIGN PATENT DOCUMENTS

| | | |
|---|---|---|
| WO | WO2011/041719 A2 | 4/2011 |
| WO | WO 2014/107888 A1 | 7/2014 |

*Primary Examiner* — Dominic Rego
(74) *Attorney, Agent, or Firm* — Harrington & Smith (57) ABSTRACT

An apparatus and a method are disclosed by which transmit power for each antenna element of an antenna array for beamforming is determined by determining a weight vector including a weight for each antenna element according to a specific beamforming procedure, it is detected whether at least one of the plurality of antenna elements is saturated, wherein an antenna element is saturated when the determined transmit power for this antenna element is higher than a threshold, and, when it is detected that there is at least one saturated antenna element, the transmit power for each antenna element of the antenna array is adjusted such that a part of the transmit power allocated to the at least one saturated antenna element is allocated to at least one antenna element of the antenna array which is not saturated based on the weight vector determined according to the specific beamforming procedure.

17 Claims, 5 Drawing Sheets

(56) References Cited

U.S. PATENT DOCUMENTS

| | | | | |
|---|---|---|---|---|
| 2003/0017852 A1* | 1/2003 | Miyatani | ............... | H01Q 1/246 |
| | | | | 455/562.1 |
| 2003/0063695 A1* | 4/2003 | Lee | ..................... | H04B 7/0817 |
| | | | | 375/347 |
| 2005/0181736 A1* | 8/2005 | Cao | ................... | H04B 7/0669 |
| | | | | 455/69 |
| 2006/0019710 A1* | 1/2006 | Ylitalo | ................ | H01Q 3/2605 |
| | | | | 455/562.1 |
| 2008/0165877 A1* | 7/2008 | Guo | ..................... | H04B 7/043 |
| | | | | 375/262 |
| 2009/0011787 A1* | 1/2009 | Kikuma | ............... | H04B 7/061 |
| | | | | 455/522 |
| 2012/0326781 A1* | 12/2012 | Mori | ..................... | H01Q 3/26 |
| | | | | 330/127 |
| 2013/0122956 A1* | 5/2013 | Lee | ..................... | H04W 52/04 |
| | | | | 455/522 |
| 2014/0129425 A1* | 5/2014 | Yang | ................ | G06K 7/10158 |
| | | | | 705/39 |
| 2015/0097569 A1* | 4/2015 | Longley | ............... | G01V 15/00 |
| | | | | 324/327 |

\* cited by examiner

LIMITED WATERFILLING: A METHOD TO ADJUST THE TRANSMIT POWER FOR EIGENVALUE BASED BEAMFORMING

FIELD OF THE INVENTION

The present invention relates to an apparatus, a method and a computer program product for adjusting transmit power for eigenvalue based beamforming.

RELATED BACKGROUND ART

The following meanings for the abbreviations used in this specification apply:
EBB—Eigenvalue Based Beamforming
eNB—evolved node B
EVD—Eigen Value Decomposition
PAPR—Peak-to-Average Power Ratio
POS—Power Overshoot
LWF—Limited Waterfilling
BS—Base Station Embodiments of the present invention relate to beamforming. Beamforming is achieved by weighting the transmit signal for multi-antenna based on estimated channel information to make the signal combined coherently in the air and increase the power gain in the direction of the desired user. Eigenvalue Based Beamforming (EBB) is one of the beamforming methods using Eigen Value Decomposition (EVD) to compute the weights.

Figure 4:
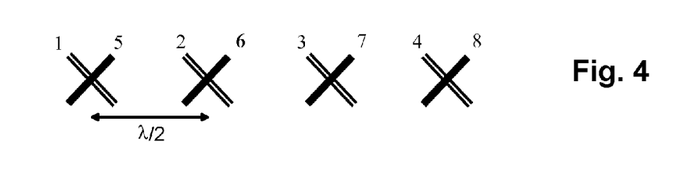
FIG. 4 illustrates an X-pol antenna array with 4 columns.

FIG. 4 shows an example of an antenna array with 4 X-pol elements. For this antenna array, the 1×4 dominant eigen vector resulted from EVD is used as the weight vector and applied to both polarization. The phase information of which are to compensate the phase differences of the channel responses for different X-pol elements while the amplitude information are to optimally distribute the total transmit power among the X-pol elements according to the channel estimates. As for both polarizations the same 1×4 weight vector is used, in the following only one of the polarizations is shown for illustration.

A problem regarding this way of determining the transmit power for each antenna element of the antenna array is rooted from the conflict between EBB's power distribution nature and hardware characteristics limitation. EBB distributes the total transmit power according to the channel estimates at different antenna elements, say more power is allocated to the antenna element with better channel response, and generally the channel responses are not equally good across the antenna elements. On the other hand, we have a uniform antenna array that is each antenna element with the same power radiation capability. Therefore, when we apply the beamforming weights to the transmit antenna array, some of the antenna elements work out of the linear amplifier range, this brings high PAPR problem and may trigger an alarm or lead to broken antenna if, sometimes, one of the antenna elements gets a very good channel response and most of the power is allocated to it, which is the so-called Power Overshoot (POS) issue.

Figure 5:
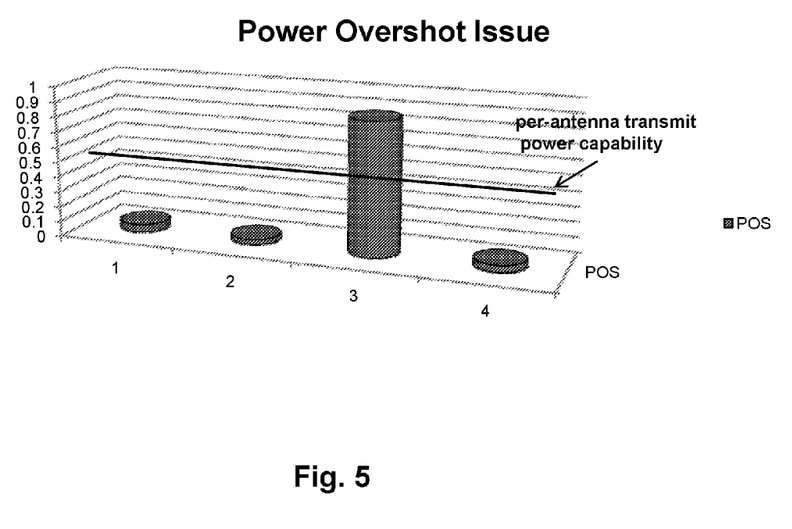
FIG. 5 illustrates the power overshot issue.

This is illustrated in FIG. 5, in which an example is shown in which more transmit power than the per-antenna (element) transmit power capability is allocated to antenna element 3.

According to the prior art, to avoid the POS issue, generally the total transmit power of beamforming is decreased with a fixed scaling. This measure is introduced not only for POS, but also to mitigate the severe inter-cell interference when beamforming is switched on. In addition, if the problem is still there with the decreased total power, a fixed safe weight vector will replace the one computed from EBB. Consequently, both the phase and amplitude weighting information are lost. Another way to tackle the problem is that the overshot power is simply removed to match the antenna capability, the so called power capping, which makes the total transmit power unstable and vary with respect the channel condition. There is also a method removing the amplitude information of the weight vector and let all antenna elements transmit with maximum power, namely phase only method. This method is not a good option from the cost-efficient point of view; also it brings severe inter-cell interference.

Hence, there is need for an improved approach to avoid the power overshot issue.

Figure 6:
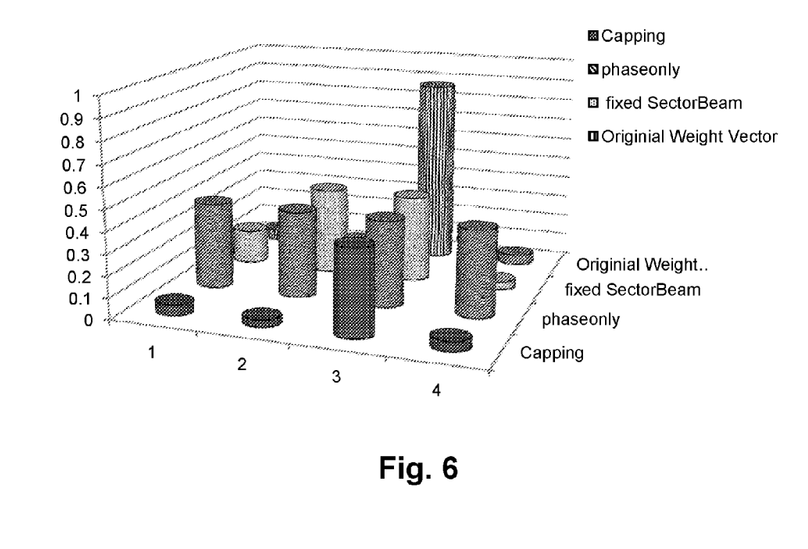
FIG. 6 illustrates prior art methods for overcoming the power overshot issue.

FIG. 6 shows a diagram in which the above prior art methods to avoid the POS issue are illustrated. The last row shows the original weight vector, the penultimate row shows the fixed sector beam method, the second row shows the phase only method, and the first row shows the capping method.

SUMMARY OF THE INVENTION

Embodiments of the present invention address this situation and aim to overcome the above-described problem and to provide an improved mechanism for avoiding the power overshot issue.

According to a first aspect of the present invention an apparatus is provided which comprises
  a processor and
  a memory for storing instructions to be executed by the processor, wherein the processor is configured
  to determine transmit power for each antenna element of an antenna array for beamforming by determining a weight vector comprising a weight for each antenna element according to a specific beamforming procedure,
  to detect whether at least one of the plurality of antenna elements is saturated, wherein an antenna element is saturated when the determined transmit power for this antenna element is higher than a threshold, and,
  when it is detected that there is at least one saturated antenna element, to adjust the transmit power for each antenna element of the antenna array such that a part of the transmit power allocated to the at least one saturated antenna element is allocated to at least one antenna element of the antenna array which is not saturated based on the weight vector determined according to the specific beamforming procedure.

According to a second aspect of the present invention a method is provided which comprises
  determining transmit power for each antenna element of an antenna array for beamforming by determining a weight vector comprising a weight for each antenna element according to a specific beamforming procedure,
  detecting whether at least one of the plurality of antenna elements is saturated, wherein an antenna element is saturated when the determined transmit power for this antenna element is higher than a threshold, and,
  when it is detected that there is at least one saturated antenna element, adjusting the transmit power for each antenna element of the antenna array such that a part of the transmit power allocated to the at least one saturated antenna element is allocated to at least one antenna element of the antenna array which is not saturated based on the weight vector determined according to the specific beamforming procedure.

The first aspect and the second aspect may be modified as follows:

The threshold is a per-antenna element transmit power capability.

Upon adjusting the transmit power for each unsaturated antenna element, an adjustment factor may be calculated based on a weight vector determined by the specific beamforming procedure and on a weight of the saturated antenna element.

The adjusted weight of the at least one unsaturated antenna element may be calculated based on the following formula:

$$U'_{0,i} = \rho_i U_{0,i}, i \in A, \quad (1)$$

$$\rho_i = \sqrt{\frac{\sum_{i \in A} \|U_{0,i}\|^2 + \|U_{0,j}\|^2 - C}{\sum_{i \in A} \|U_{0,i}\|^2}},$$

where j is the saturated antenna element index, $U_{0,i}'$ is the adjusted weight of the antenna element i, $\rho_i$ is the adjustment factor, $U_{0,i}$ is the weight determined by the specific beamforming procedure, $U_0$ is the weight vector determined by the specific beamforming procedure, $U_{0,j}$ is the weight of the saturated antenna element, and C is the per-antenna element transmit power capability.

Upon adjusting the transmit power for the at least one saturated antenna element, the weight may be adjusted based on its original weight of the saturated antenna element determined according to the specific beamforming procedure and a per-antenna element transmit power capability.

The adjusted weight of the at least one saturated antenna element may be calculated based on the following formula:

$$U'_{0,j} = \sqrt{C} \frac{U_{0,j}}{\|U_{0,j}\|^2},$$

where j is the index of the saturated antenna element, $U_{0,j}'$ is the adjusted weight of the saturated antenna element j, $U_{0,j}$ is the original weight of the saturated antenna element, and C is the per-antenna element transmit power capability.

Phase information for the antenna elements of the antenna array may be determined according to the specific beamforming procedure and the determined phase information may be maintained unamended after adjusting the weights of the antenna elements.

The specific beamforming procedure may be an eigenvalue based beamforming (EBB) wherein an eigenvalue decomposition (EVD) is used to compute the weight vector.

According to a third aspect of the present invention a computer program product is provided which comprises code means for performing a method according to the second aspect and/or its modifications when run on a processing means or module. The computer program product may be embodied on a computer-readable medium.

It is to be understood that any of the above modifications can be applied singly or in combination to the respective aspects and/or embodiments to which they refer, unless they are explicitly stated as excluding alternatives.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

According to some embodiments of the present invention, a method, named Limited Waterfilling (LWF) is introduced to adjust the transmit powers (the amplitude information of the weight vector) for EBB. According to LWF, overshot power will be allocated to unsaturated antenna elements according to their power ratio in original weight vector.

This measure will be repeated until there is no saturated antenna element. This method works under arbitrary total transmit power constraint and per-antenna transmit power capability. It adaptively conserves the most of the amplitude information of the original weight vector and meanwhile keeps the phase information unchanged. By properly configuring total transmit power constraint under a specific per-antenna transmit power, it can also automatically regress to the prior methods.

Figure 1:
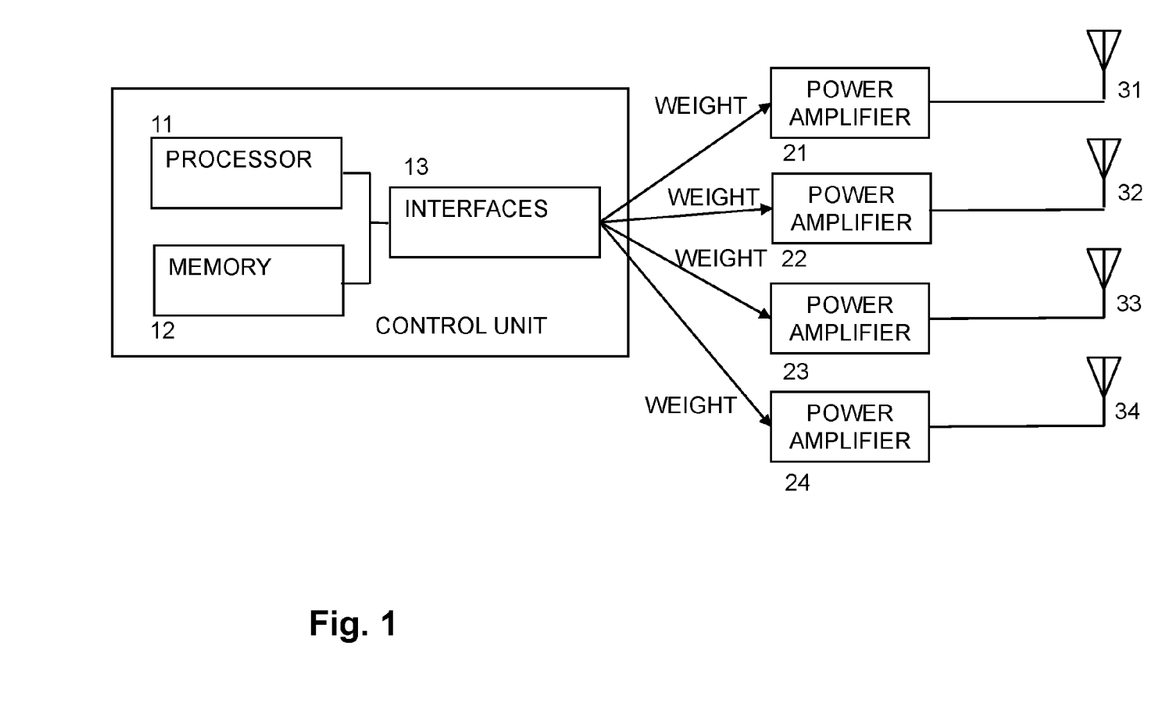
FIG. 1 shows a simplified overview of a control unit for controlling transmit power of four antenna elements of an antenna array according to an embodiment of the present invention.

FIG. 1 illustrates a simplified block diagram of a control unit 1 for determining transmit power of antenna elements of an antenna array according to a general embodiment of the present invention. It is noted that in the following, embodiments of the present invention are described by referring to an example of four antenna elements (also referred to as antennas) of an antenna array. However, the embodiments are not limited to this, and the antenna array may comprise an arbitrary number of antenna elements.

The control unit comprises a processor 11 and a memory 12 for storing instructions to be executed by the processor. In addition, interfaces 13 may be provided, by which a connection to power amplifiers 21 to 24 of antenna elements 31 to 34 of an antenna array is provided.

The processor 11 is configured to determine transmit power for each antenna element 31 to 34 of the antenna array for beamforming by determining a weight vector comprising a weight for each antenna element according to a specific beamforming procedure, to detect whether at least one of the plurality of antenna elements is saturated, wherein an antenna element is saturated when the determined transmit power for this antenna element is higher than a threshold, and, when it is detected that there is at least one saturated antenna element, to adjust the transmit power for each antenna element of the antenna array such that a part of the transmit power allocated to the at least one saturated antenna element is allocated to at least one antenna element of the antenna array which is not saturated based on the weight vector determined according to the specific beamforming procedure.

In this way, according to embodiments of the present invention, the transmit power of each antenna element of the antenna array, which is determined based on EBB, is adjusted so that a power overshoot occurring at an antenna element (a saturated antenna element) is distributed on the other antenna elements. That is, the control unit 1 applies the weights adjusted as described above to the transmit signal corresponding to antenna elements 31 to 34 to let power amplifiers 21 to 24 work at linear region and avoid power overshot issue.

It is noted that, as mentioned above, an antenna element is considered to be saturated when the transmit power which has been allocated by the specific beamforming procedure (e.g., EBB) is above a certain threshold, which may be the per-antenna (element) transmit power capability C, for example. Consequently, an antenna element is considered to be unsaturated when it is equal to or below this threshold.

Figure 2:
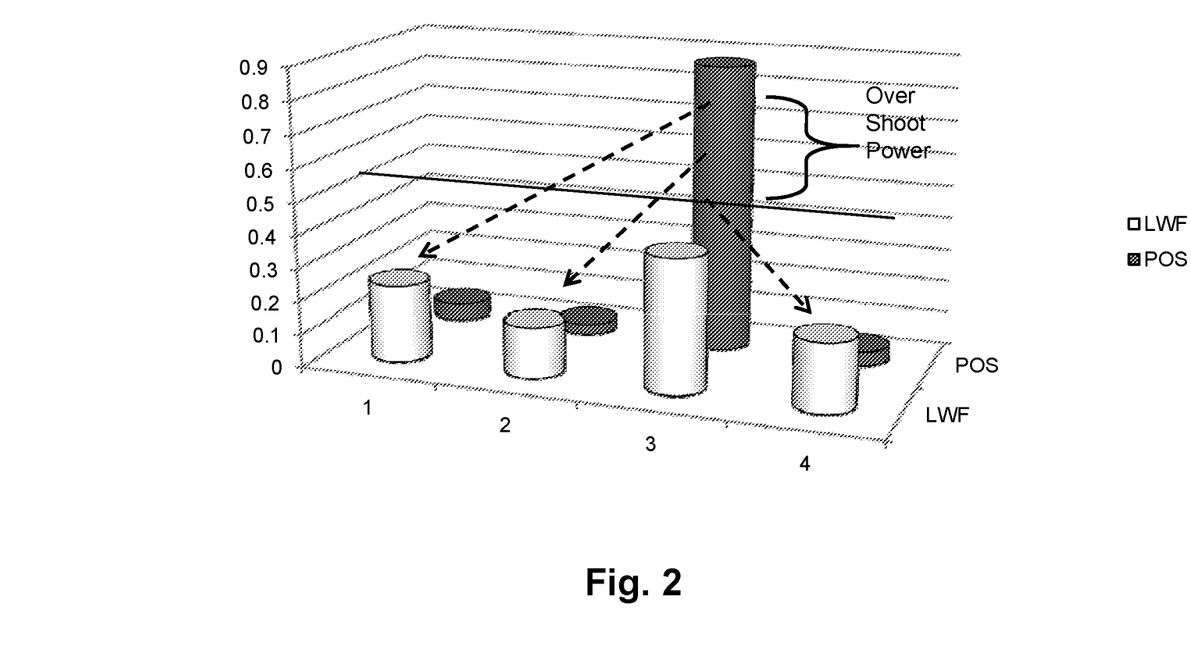
FIG. 2 illustrates a limited waterfilling procedure according to an embodiment of the present invention.

In the following, a more detailed embodiment of the present invention is described by referring to FIG. 2, which illustrates the limited waterfilling procedure. In particular, the last row illustrates the power overshot situation. That is, in this example, power overshoot issue happens to antenna element 3 after the EBB procedure. The front row shows the situation when using the limited waterfilling (LWF) procedure according to the embodiment of the present invention.

In detail, according to LWF method, overshoot power will be allocated to the unsaturated antenna element according to their power ratio in the original weight vector under POS case. Suppose $U_0=[U_{0,1},U_{0,2},U_{0,3},U_{0,4}]$ is the original weight vector with nonzero elements computed from EVD, antenna element with index j, $j \in \{1, 2, 3, 4\}$, is found to be saturated and one with index within A, a subset of $\{1, 2, 3, 4\}$ and $j \notin A$, is unsaturated, then we update the amplitude information at the unsaturated antenna element as below, $$U'_{0,i} = \rho_i U_{0,i}, i \in A, \qquad (1)$$

$$\rho_i = \sqrt{\frac{\sum_{i \in A} \|U_{0,i}\|^2 + \|U_{0,j}\|^2 - C}{\sum_{i \in A} \|U_{0,i}\|^2}},$$

where C is the maximum power according to antenna transmit capability, and $\rho_i$ is referred to as an adjustment factor or as a power update ratio.

The amplitude of the saturated antenna element is updated as $$U'_{0,j} = \sqrt{C} \frac{U_{0,j}}{\|U_{0,j}\|^2}, \qquad (2)$$

The updating procedure is repeated until there is no saturated antenna element.

As it is shown, only the amplitude info is updated. LWF keeps the phase information of the original weight vector as it is. Compared to fallback to a fixed beam, LWF is much better at conserving the weighting information. LWF also keeps the total transmit power according to the planning, it just reallocate the overshoot power at the saturated antenna element to the unsaturated ones. Compared to the capping method, it makes the power gain more stable and the total radiating interference more under control, which facilitates the network planning. Last but not least, as long as the total power constraint S is lower than or equal to the sum transmit power of the antenna array, $$S \le N_{Tx} \cdot C \qquad (3)$$

where $N_{Tx}$ is the number of transmitting antenna elements in the antenna array and C is per-antenna transmit power capability, LWF works under arbitrary total power constraint; say it provides more flexibility to adjust the inter-cell interference resulted from beamforming than the method removing the amplitude information and letting all antenna elements transmit with maximum power, the phase only method. Note that, if we let $S=N_{Tx} \cdot C$, LWF naturally regress to phase only method.

Figure 3:
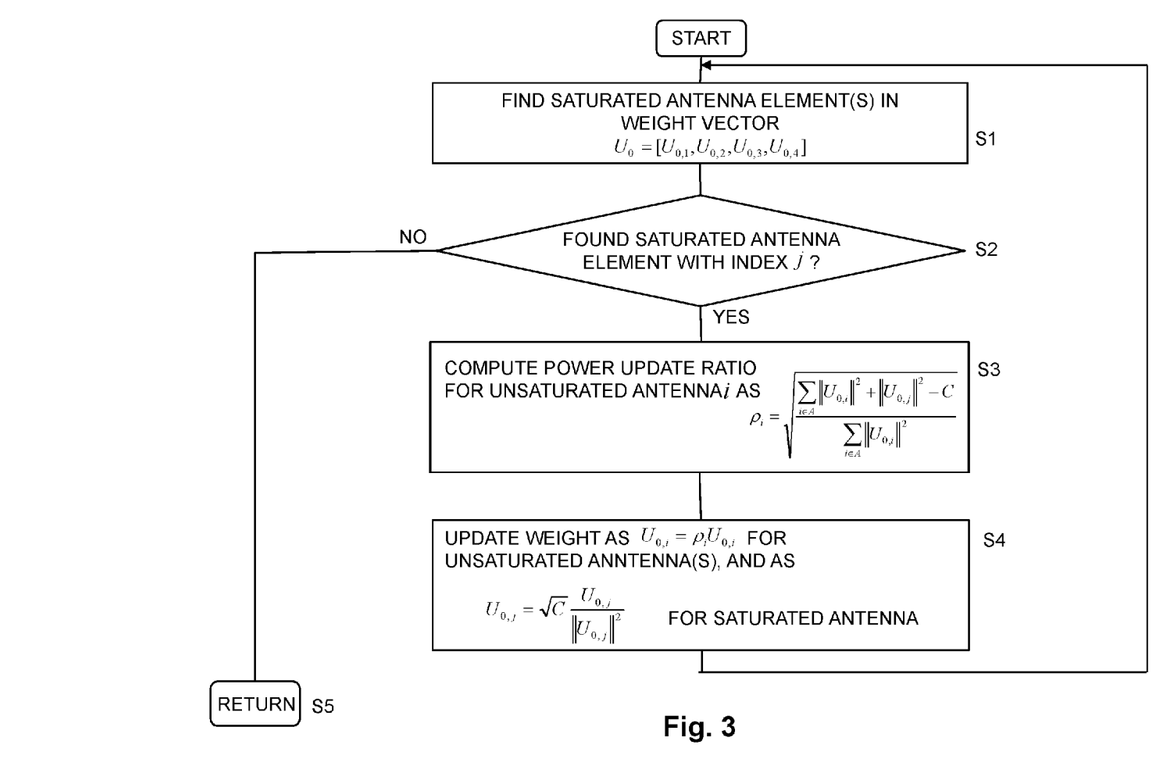
FIG. 3 shows a flowchart of a procedure according to an embodiment of the present invention.

The detail update procedure of LWF is described in the following by referring to the flowchart shown in FIG. 3.

In step S1, saturated antenna element indexes in weight vector $U_0=[U_{0,1},U_{0,2},U_{0,3},U_{0,4}]$ are searched for.

In step S2, if a saturated antenna element with index j is found, the procedure goes to step S3. Else, the procedure goes to step S5, so that the procedure is ended.

In step S3, the power update ratio for unsaturated antenna element i is computed as $$\rho = \sqrt{\frac{\sum_{i \in A} \|U_{0,i}\|^2 + \|U_{0,j}\|^2 - C}{\sum_{i \in A} \|U_{0,i}\|^2}}.$$

In step S4, the weight vector is updated as $U_{0,i}=\rho_i U_{0,i}$ for the unsaturated antenna elements, and as $$U_{0,j} = \sqrt{C} \frac{U_{0,j}}{\|U_{0,j}\|^2},$$

for the saturated antenna j. Thereafter, the procedure returns to step S1.

Step S5 indicates return, or the end of the procedure, which is reached when there are no more further saturated antenna elements.

In the following, as a practice example a MATLAB Implementation of LWF in simulator is shown as below.
State_o.EigenVector{User}—the original weight vector computed from EVD
MaxAllowedPower—per antenna power capability, the amplitude value
Epsilon—a very small number according to platform precision
while any(abs(State_o.EigenVector{User})> . . . .
  (MaxAllowedPower+Epsilon))
  % finding the POS AntGrp Idx and the SAFE AntGrp Idx
  OverShootingAntGrpIdx=find(abs
    (State_o.EigenVector{User}) . . . .
    MaxAllowedPower>0);
  SafeAntGrpIdx=find(abs(State_o.EigenVector{User}) . . .
  .
    MaxAllowedPower<=0);
  % computing the overshooting power for further allocation
  OverShootingPower= . . . .
abs(State_o.EigenVector{User}(OverShootingAntGrpIdx
(1)))^2;

MarginPower=OverShootingPower−MaxAllowed-
Power^2;
% further allocation of the overshooting power
NonOverShootingPowerSum= . . . .
sum(abs(State_o.EigenVector{User}(SafeAntGrpIdx)).^2);
PowerAllocRatio=(NonOverShootingPowerSum+Mar-
ginPower)/ . . . .
NonOverShootingPowerSum;
PowerAllocRatio=sqrt(PowerAllocRatio);
State_o.EigenVector{User}(SafeAntGrpIdx)= . . . .
State_o.EigenVector{User}(SafeAntGrpIdx).*
PowerAllocRatio;
PowerReduceRatio=(MaxAllowedPower^2)/OverShoot-
ingPower;
PowerReduceRatio=sqrt(PowerReduceRatio);
State_o.EigenVector{User}(OverShootingAntGrpIdx
(1))= . . . .
State_o.EigenVector{User}(OverShootingAntGrpIdx
(1))* . . . .
PowerReduceRatio;
end Thus, by the embodiments described above it is possible to adjust the transmit powers of antenna elements in an antenna array such that power overshoot of an antenna element can be avoided and the overshoot power is distributed on the unsaturated antenna elements such that the power distribution between the elements is basically maintained, wherein also the original phase information is maintained unamended.

It is noted that the embodiments and the present invention in general is not limited to the specific examples given above.

For example, the EBB procedure is only an example for a specific beamforming procedure by which weight vector is determined such that power overshoot issue for at least one antenna element of an antenna array may occur (i.e., a saturated antenna element may occur). Thus, the invention also applicable to other methods determining weight vectors for beamforming, as long they bring non-uniform power distribution.

As mentioned above, the embodiments were described by referring to an antenna array having four antenna elements. However, the invention is not limited on the number of antenna elements, and any arbitrary number of antenna elements may be present in an antenna array, as long as there are at least two antenna elements.

The control unit and the antenna array as shown in FIG. 1 may be applied in a base station, an eNB or the like. Thus, the control unit may be a part of the main control unit of such a base station or eNB, and/or the functions of the control unit as described according to the embodiments may be implemented by the main control unit of such a base station or eNB.

According to another aspect of embodiments of the invention, an apparatus is provided which comprises means for determining transmit power for each antenna element of an antenna array for beamforming by determining a weight vector comprising a weight for each antenna element according to a specific beamforming procedure,
means for detecting whether at least one of the plurality of antenna elements is saturated, wherein an antenna element is saturated when the determined transmit power for this antenna element is higher than a threshold, and,
means for adjusting, when it is detected that there is at least one saturated antenna element, the transmit power for each antenna element of the antenna array such that a part of the transmit power allocated to the at least one saturated antenna element is allocated to at least one antenna element of the antenna array which is not saturated based on the weight vector determined according to the specific beamforming procedure.

It is to be understood that any of the above modifications can be applied singly or in combination to the respective aspects and/or embodiments to which they refer, unless they are explicitly stated as excluding alternatives.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising
   a processor and
   a memory for storing instructions to be executed by the processor, wherein the processor is configured
   to determine transmit power for each antenna element of an antenna array for beamforming by determining a weight vector comprising a weight for each antenna element according to a specific beamforming procedure,
   to detect whether at least one of the plurality of antenna elements is saturated, wherein an antenna element is saturated when the determined transmit power for this antenna element is higher than a threshold, and,
   when it is detected that there is at least one saturated antenna element, to adjust the transmit power for each antenna element of the antenna array such that a part of the transmit power allocated to the at least one saturated antenna element is allocated to at least one antenna element of the antenna array which is not saturated based on the weight vector determined according to the specific beamforming procedure.

2. The apparatus according to claim 1, wherein the threshold is a per-antenna element transmit power capability.

3. The apparatus according to claim 1, wherein the processor is configured,
   upon adjusting the transmit power for each unsaturated antenna element, to calculate an adjustment factor based on a weight vector determined by the specific beamforming procedure and on a weight of the saturated antenna element.

4. The apparatus according to claim 3, wherein the processor is configured to calculate the adjusted weight of the at least one unsaturated antenna element based on the following formula:

$$U'_{0,i} = \rho_i U_{0,i}, \; i \in A, \quad (1)$$

$$\rho_i = \sqrt{\frac{\sum_{i \in A} \|U_{0,i}\|^2 + \|U_{0,j}\|^2 - C}{\sum_{i \in A} \|U_{0,i}\|^2}},$$

where j is the saturated antenna element index, $U_{0,i}'$ is the adjusted weight of the antenna element i, $\rho_i$ is the adjustment factor, $U_{0,i}$ is the weight determined by the specific beamforming procedure, $U_0$ is the weight vector determined by the specific beamforming procedure, $U_{0,j}$ is the weight of the saturated antenna element, and C is the per-antenna element transmit power capability.

5. The apparatus according to claim 3, wherein the processor is configured,
   upon adjusting the transmit power for the at least one saturated antenna element, to adjust the weight based on its original weight of the saturated antenna element determined according to the specific beamforming procedure and a per-antenna element transmit power capability.

6. The apparatus according to claim 5, wherein the processor is configured to calculate the adjusted weight of the at least one saturated antenna element based on the following formula:

$$U'_{0,j} = \sqrt{C} \, \frac{U_{0,j}}{\|U_{0,j}\|^2},$$

where j is the index of the saturated antenna element, $U_{0,j}'$ is the adjusted weight of the saturated antenna element j, $U_{0,j}$ is the original weight of the saturated antenna element, and C is the per-antenna element transmit power capability.

7. The apparatus according to claim 1, wherein the processor is configured to determine phase information for the antenna elements of the antenna array according to the specific beamforming procedure and to maintain the determined phase information unamended after adjusting the weights of the antenna elements.

8. The apparatus according to claim 1, wherein the specific beamforming procedure is an eigenvalue based beamforming wherein an eigenvalue decomposition is used to compute the weight vector.

9. A method comprising
   determining transmit power for each antenna element of an antenna array for beamforming by determining a weight vector comprising a weight for each antenna element according to a specific beamforming procedure,
   detecting whether at least one of the plurality of antenna elements is saturated, wherein an antenna element is saturated when the determined transmit power for this antenna element is higher than a threshold, and,
   when it is detected that there is at least one saturated antenna element, adjusting the transmit power for each antenna element of the antenna array such that a part of the transmit power allocated to the at least one saturated antenna element is allocated to at least one antenna element of the antenna array which is not saturated based on the weight vector determined according to the specific beamforming procedure.

10. The method according to claim 9, wherein the threshold is a per-antenna element transmit power capability.

11. The method according to claim 9, further comprising
    upon adjusting the transmit power for each unsaturated antenna element, calculating an adjustment factor based on a weight vector determined by the specific beamforming procedure and on a weight of the saturated antenna element.

12. The method according to claim 11, further comprising
    calculating the adjusted weight of the at least one unsaturated antenna element based on the following formula:

$$U'_{0,i} = \rho_i U_{0,i}, \; i \in A, \quad (1)$$

$$\rho_i = \sqrt{\frac{\sum_{i \in A} \|U_{0,i}\|^2 + \|U_{0,j}\|^2 - C}{\sum_{i \in A} \|U_{0,i}\|^2}},$$

where j is the saturated antenna element index, $U_{0,i}'$ is the adjusted weight of the antenna element i, $\rho_i$ is the adjustment factor, $U_{0,i}$ is the weight determined by the specific beamforming procedure, $U_0$ is the weight vector determined by the specific beamforming procedure, $U_{0,j}$ is the weight of the saturated antenna element, and C is the per-antenna element transmit power capability.

13. The method according to claim 11, further comprising,
    upon adjusting the transmit power for the at least one saturated antenna element, adjusting the weight based on its original weight of the saturated antenna element determined according to the specific beamforming procedure and a per-antenna element transmit power capability.

14. The method according to claim 13, further comprising calculating the adjusted weight of the at least one saturated antenna element based on the following formula:

$$U'_{0,j} = \sqrt{C} \frac{U_{0,j}}{\|U_{0,j}\|^2},$$

where j is the index of the saturated antenna element, $U_{0,j}'$ is the adjusted weight of the saturated antenna element j, $U_{0,j}$ is the original weight of the saturated antenna element, and C is the per-antenna element transmit power capability.

15. The method according to claim 9, further comprising determining phase information for the antenna elements of the antenna array according to the specific beamforming procedure and maintaining the determined phase information unamended after adjusting the weights of the antenna elements.

16. The method according to claim 9, wherein the specific beamforming procedure is an eigenvalue based beamforming wherein an eigenvalue decomposition is used to compute the weight vector.

17. A computer program product comprising a non-transitory computer-readable medium having program code configured to cause an apparatus to perform operations, when run on the apparatus, comprising:

determining transmit power for each antenna element of an antenna array for beamforming by determining a weight vector comprising a weight for each antenna element according to a specific beamforming procedure, detecting whether at least one of the plurality of antenna elements is saturated, wherein an antenna element is saturated when the determined transmit power for this antenna element is higher than a threshold, and, when it is detected that there is at least one saturated antenna element, adjusting the transmit power for each antenna element of the antenna array such that a part of the transmit power allocated to the at least one saturated antenna element is allocated to at least one antenna element of the antenna array which is not saturated based on the weight vector determined according to the specific beamforming procedure.

* * * * *

UNITED STATES PATENT AND TRADEMARK OFFICE
CERTIFICATE OF CORRECTION

PATENT NO.        : 9,780,848 B2
APPLICATION NO.   : 15/326688
DATED             : October 3, 2017
INVENTOR(S)       : Xiaomao Mao Page 1 of 1

It is certified that error appears in the above-identified patent and that said Letters Patent is hereby corrected as shown below:

In the Claims

In Claim 4:

Column 9, Line 49, "$U_{0,i}$" should be deleted and -- $U'_{0,i}$ -- should be inserted.

In Claim 6:

Column 10, Line 6, "$U_{0,j}$" should be deleted and -- $U'_{0,j}$ -- should be inserted.

In Claim 12:

Column 10, Line 58, "$U_{0,i}$" should be deleted and -- $U'_{0,i}$ -- should be inserted.

In Claim 14:

Column 11, Line 15, "$U_{0,j}$" should be deleted and -- $U'_{0,j}$ -- should be inserted.

Signed and Sealed this
Fourteenth Day of November, 2017

Joseph Matal
*Performing the Functions and Duties of the
Under Secretary of Commerce for Intellectual Property and
Director of the United States Patent and Trademark Office*